United States Patent

Gorlov et al.

[11] Patent Number: 4,747,481
[45] Date of Patent: May 31, 1988

[54] DRAG MEMBER OF FLIGHT CONVEYER

[75] Inventors: Viktor M. Gorlov; Alexandr G. Levin; Igor V. Spivak, all of Donetsk, U.S.S.R.

[73] Assignee: Donetsky Nauchnoissledovatelsky Ugolny Institut, Donetsk, U.S.S.R.

[21] Appl. No.: 881,952

[22] Filed: Jul. 3, 1986

[51] Int. Cl.⁴ .............................................. B65G 19/26
[52] U.S. Cl. ..................................... 198/731; 198/732
[58] Field of Search ................................. 198/731, 732

[56] References Cited

U.S. PATENT DOCUMENTS

| 3,615,002 | 10/1971 | Bolton | 198/732 |
| 4,566,587 | 1/1986 | Gorlov et al. | 198/732 |

FOREIGN PATENT DOCUMENTS

| 676611 | 6/1939 | Fed. Rep. of Germany | 198/732 |
| 1109602 | 6/1961 | Fed. Rep. of Germany | 198/731 |
| 3301685 | 8/1984 | Fed. Rep. of Germany | . |
| 2102756 | 2/1983 | United Kingdom | 198/731 |
| 372362 | 3/1973 | U.S.S.R. | . |
| 804549 | 2/1981 | U.S.S.R. | 198/732 |
| 831675 | 5/1981 | U.S.S.R. | 198/732 |
| 870277 | 10/1981 | U.S.S.R. | . |
| 876523 | 10/1981 | U.S.S.R. | . |

Primary Examiner—Stephen J. Novosad
Assistant Examiner—John F. Letchford
Attorney, Agent, or Firm—Fleit, Jacobson, Cohn & Price

[57] ABSTRACT

The invention relates to flight conveyers with drag chains running in a closed loop in a horizontal plane.

The drag member of the flight conveyor comprises flights connected by vertical studs to straight portions of the vertical links of the chains which are vertically spaced and form a closed loop in a horizontal plane. Each flight is detachably assembled of a central part and yoke-shaped end parts receiving in their openings the central part of the flight, and the stud having heads on the ends thereof, the diameter of those heads being greater than the width of the opening. One of these heads has a through-going slot for joining the stud to the straight portions of a vertical link of the respective chain.

4 Claims, 3 Drawing Sheets

DRAG MEMBER OF FLIGHT CONVEYER

FIELD OF THE INVENTION

The present invention relates to conveyers, and more particularly it relates to the traction or drag member of a flight conveyer, forming a closed loop in a horizontal plane.

The present invention can be employed to utmost advantage in underground coal mining, for carrying coal from a stope to an adjoining mine working where there is other haulage means for transporting the coal to a mine shaft.

The invention is particularly useful at stoping faces in thin coal seams, i.e. in environment imposing definite limitations on the dimensions of the equipment used, so that the employment of flight conveyers presents difficulties. In underground coal mining, and in the winning of coal from elongated stoping faces, in particular, the use of flight conveyers with drag chains forming closed loops in a horizontal plane allows for eliminating the manual work of excavating stable holes at the ends of a stoping face, as well as for simplifying the maintenance of the flight conveyer by affording unobstructed access to the return run of its drag member.

The disclosed drag member of a flight conveyer can also be employed for handling diversified unit loads and bulk materials in various trades and industries, e.g. in engineering, agriculture, chemical industry where the working environment calls for facilitated mounting/dismantling of the flights, and also for avoiding the effect of the pulling effort of the conveyer drive upon the components of the joints between the flights and the drag chains.

PRIOR ART

In a conventional design of the drag or traction members of flight conveyers employed in underground coal mining, these members are made of lengths of round-link chains joined into a single closed loop with the aid of C-shaped connection links with split legs, to which the flights are fastened by threaded bolts and nuts (see, for example, USSR Inventor's Certificate No. 870,277; Int.Cl.$^2$ B 65 G 19/24).

A shortcoming of this design is the reduced actual rupture strength of the drag member on account of the split legs of the connection links, to say nothing of the necessity of periodically tightening the bolts taking up the traction effort of the conveyer drive and securing the flights to the connection links. The enhancement of the strength of the C-shaped connection links incurs considerable costs involved in using expensive materials for their manufacture and sophisticated technologies of their fabrication. However, even these costly measures fail to render the connection links as strong as other welded links of a drag chain.

An advanced trend in the design of present-day drag members of flight conveyers is having their structure providing a mounting for a scraper flight on any chosen link of the drag chain (without using C-shaped connection links). This has been found to enhance both the performance reliability and durability of the drag member and of the flight conveyer, as a whole.

Thus, there is known a drag member of a working-face flight conveyer (see, for example, DT Offenlegungsschrift No. 3,301,685 A1; Int.Cl.$^3$ B 65 G 19/22), comprising flights rigidly fastened directly to the horizontally extending links of the drag chain. However, this design of drag member provides for normal geometric parameters of the engagement of the chain with the driving and idling sprockets of the conveyer solely when the shafts carrying these sprockets are arranged horizontally, i.e. when the drag member forms a closed loop in a vertical plane.

The operation of a conveyer with the drag member closed in a horizontal plane is based on the vertical arrangement of the shafts carrying the driving and idling sprockets, and on pivotal rather than rigid connection of the scraper flights with the vertically set links of the drag chains (see, for example, SU Inventor's Certificate No. 372,362). Therefore, the technical solutions offered by the abovecited DT Offenlegungsschrift No. 3,301,685 A1 cannot be embodied in the design of a drag member closed in a horizontal plane. Furthermore, a drawback of the structure disclosed in this source is its complexity due to the presence of the straps and bolted joints fastening the flight to the drag chain.

There is further known a drag member of a flight conveyer comprising a chain forming a closed loop in a horizontal plane and flights joined to the chain by vertical studs fastened to the vertical links of the chain (see U.S. Pat. No. 3,615,002). A shortcoming of this drag member is that it includes only a single drag chain on which the flights are mounted in a cantilever fashion, so that it is virtually impossible to ensure the reliable performance of the drag member and stable attitude of the flights accompanied by high throughputs meeting the demands of present-day coal-winning sets. Furthermore, this drag member of the prior art would not allow for replacing in service the most worn-out parts of a scraper flights, providing as it does solely for replacing the flight in its entirety, which increases the operating cost.

The closest prior art of the present invention is the drag member of a flight conveyor comprising flights connected by vertical studs to the straight portions of the vertical links of vertically spaced chains forming a closed loop in a horizontal plane (see SU Inventor's Certificate No. 876,523; Int.Cl.$^3$ B 65 G 19/24).

A shortcoming of this last-mentioned design of the drag member of a flight conveyer is that in service the end parts of the scraper flights, which are joined to the chains, accommodated in the guides of the supporting framework of the conveyer and subjected to intense wear in operation, cannot be replaced whenever necessary otherwise than by replacing the scraper flights as a whole. On the other hand, scraper flights damaged in their central part can be replaced in operation only together with their end parts, although the replacement of the latter may not yet be necessary. Consequently, the maintenance of the drag member of a flight conveyer is complicated, and in most applications costly wear-resistant steel grades are used for making not only the end parts of the flights, but their central parts as well, which makes the drag members of flight conveyers more costly both to manufacture and operate.

While providing for a higher efficiency than the previously discussed drag member of a flight conveyer under like conditions, owing to the incorporation of two chains, the last-described drag member of a flight conveyer is not, however, sufficiently reliable in operation. In case of a longitudinal relative displacement of the two chains, which is not infrequent in the operation of double-strand drag members of flight conveyers, the traction effort is transmitted to the vertical studs carrying the flights, which amounts to additional loading of the studs. The cyclic pattern of the loading as the chains are relatively longitudinally displaced in alternating directions eventually causes a breakdown of the studs. This increases the downtime in the service of the flight conveyer and affects the otherwise attainable rate of winning coal from a stoping face.

Another drawback of the last-described drag member is the complicated structure of the joints between a flight and the chains, which increases the input of labour into the assembling of the drag member.

SUMMARY OF THE INVENTION

It is an object of the present invention to simplify the assembling of the drag member of a flight conveyer.

It is another object of the present invention to cut down the operating cost.

These and other objects are attained in the drag member of a flight conveyer comprising flights connected by vertical studs with the straight portions of the vertical links of respective vertically spaced chains forming closed loops in a horizontal plane in which drag member, in accordance with the present invention, each flight is detachably assembled of a central part and yoke-shaped end parts receiving each in the opening thereof the respective end portion of the central part of the flight and a portion of said stud having heads on the ends thereof, of a diameter which is greater than the width of the opening, one of the heads having a through-going slot for connecting the stud with the straight portions of the vertical link of the respective chain.

This design of the drag member of a flight conveyer provides for replacing, whenever necessary, the worn or damaged parts of the flights without their replacement as a whole. This, in its turn, provides for manufacturing the end parts of the flights and their central parts of materials with different mechanical properties, e.g. by using less costly and hard-to-get materials for manufacturing the central parts of the flights, subjected to lesser wear and strain in operation. Moreover, simplicity of the assembling/disassembling of the drag member is provided for.

It is expedient that the width of the opening of the end part of the flight in the area of its connection with the central part be smaller than the diameter of the portion of the stud, received in this opening, with the surface of the opening defining vertical notches overlapped by the respective end portion of the central part of the flight, intended for the introduction into the opening of the head of the stud, which is remote from the respective chain.

This structure of the drag member allows for increasing the free cross-sectional area of the end parts of the flight in the zone of their connection with the central part thereof, which enhances the strength of the drag member in this zone. It further provides for using the conventional T-section metal for the central part of the scraper flight. All this is attained without affecting the simplicity of the assembling/disassembling of the flights in the environment of underground operation of a flight conveyer.

It is highly expedient that the spacing of the end face of the central part of the flight from the end wall of the opening in the end part of the flight, facing this end face, be greater than the diameter of the portion of the stud, received in the opening.

This structure of the drag member of a flight conveyer provides for a free limited travel of the studs longitudinally of the flights in case of cyclic relative displacement of the chains, with the studs not being subjected to excessive additional loading, so that the performance reliability and durability of the drag member is enhanced.

In a preferred embodiment of the invention, the head of the stud has made therein, in the area of the through-going slot, a pair of peripheral partly-cylindrical recesses accommodating the adjoining curving portions of the horizontal links of the respective chain.

This design of the head of the stud stabilized its position with respect to the chain carrying it, which significantly diminishes the possibility of the scraper flights skewing and getting jammed in the guides of the framework supporting the trough of the flight conveyer.

BRIEF DESCRIPTION OF THE ACCOMPANYING DRAWINGS

Other objects and advantages of the present invention will be made apparent in the following description of an embodiment thereof, with reference being made to the accompanying drawings wherein.

DETAILED DESCRIPTION OF THE INVENTION

Figure 1:
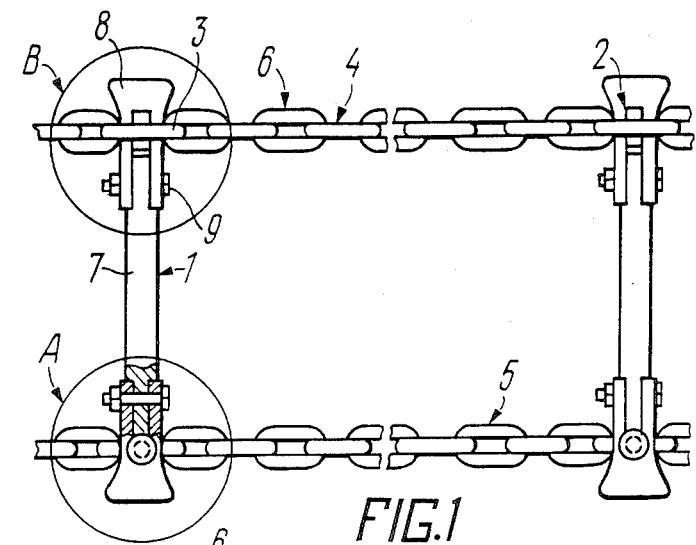
FIG. 1 is a plan view of the carrying run of the drag member of a flight conveyer.
Figure 2:
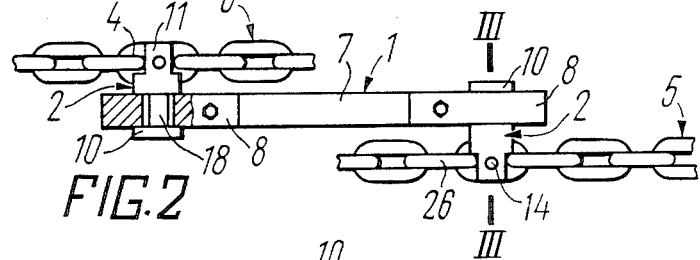
FIG. 2 is a side view of the return run of the drag member of a flight conveyer.

Referring now in particular to the appended drawings, FIGS. 1 to 8, the drag or traction member of a flight conveyer comprises scraper flights 1 joined by vertical studs 2 to the straight portions 3 of the vertical links 4 of the respective chains 5, 6.

Each flight 1 is made of a central part 7 and yoke-shaped end parts 8 detachably connected to the respective end portions of the central part 7 by bolted joints 9.

Figure 3:
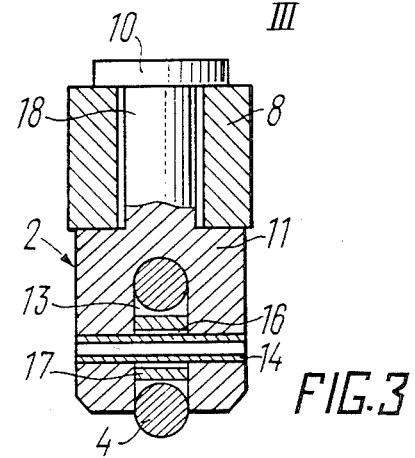
FIG. 3 is a sectional view on a larger scale taken on line III—III of FIG. 2.
Figure 4:
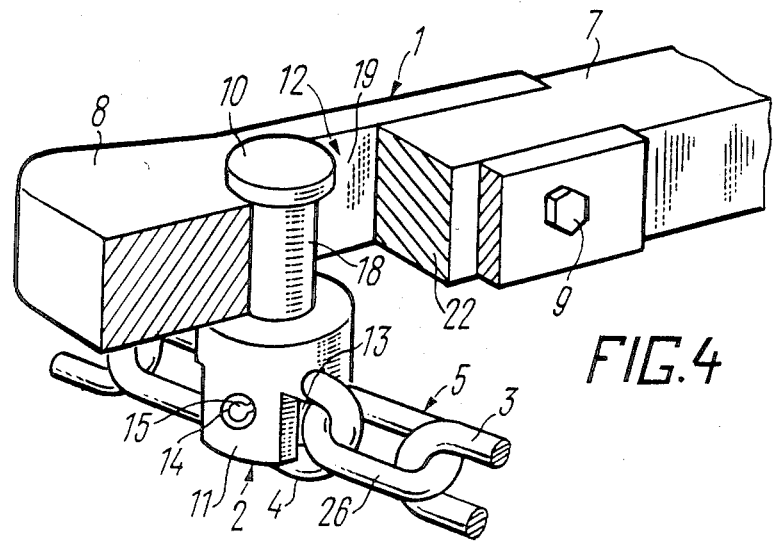
FIG. 4 is a partly cut away view of a joint between the flight and the chain.
Figure 7:
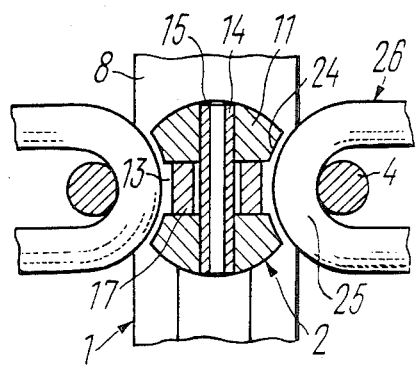
FIG. 7 shows on a larger scale a version of the area B of FIG. 1.

Each stud 2 has heads 10, 11 on its extremities and is received in the assembled state of the drag member by its central portion in the respective opening 12 of the end part 8 of the flight 1, one head 11 being fastened to the straight portions 3 of the vertical link 4 of the respective chains 5 or 6. The diameter of both heads 10, 11 is greater than the width of the opening 12 in the end part 8 of the flight 1. Each head 11 has made therethrough a slot 13 (FIG. 3) adapted to accommodate the vertical link 4 of the respective chain 5 or 6. Each stud 2 is secured to the respective link 4 of the chain 5 or 6 by means of a resilient dowel or pin 14 (or else a rivet) inserted in the bore 15 of the head 11 and through the bore 16 of an insert 17 (FIGS. 3, 7).

Figure 5:
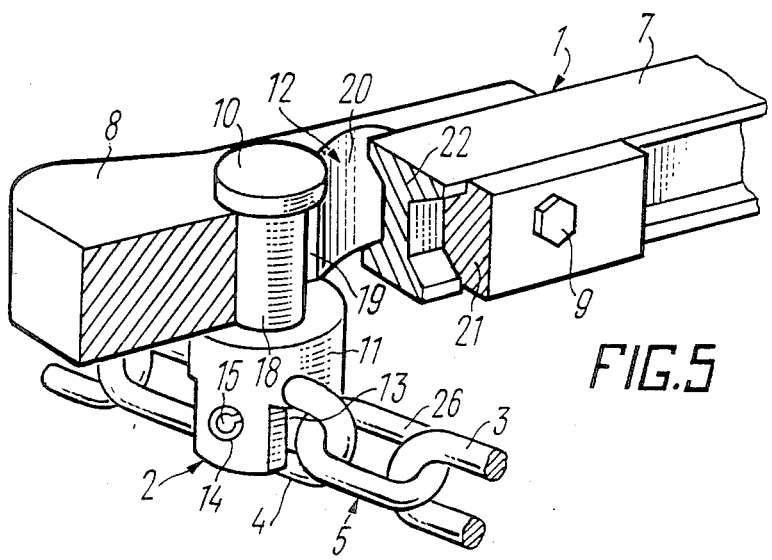
FIG. 5 is a different version of the joint shown in FIG. 4.
Figure 6:
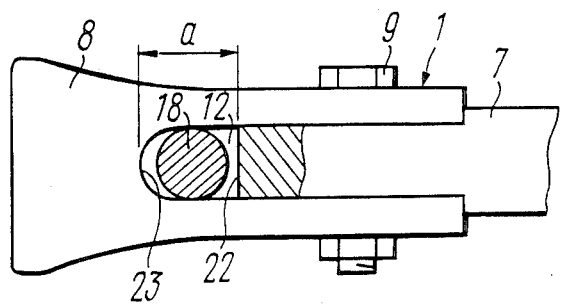
FIG. 6 shows on a larger scale the area A of FIG. 1 with the chain and the heads of the stud not shown.

The width of the opening 12 in the yoke-shaped end part 8 of the flight 1 in the area of its connection with the end portion of the central part 7 of the flight may be either greater or smaller than the diameter of the portion 18 of the stud 2, received in this opening of the end part 8 of the flight 1. In the last-mentioned case the surface 19 of the opening 12 defines an opposing pair of vertical notches 20 (FIG. 5) for the introduction of the head 10 of the stud 2 into and through the opening 12. In the assembled state of the flight, the respective end portion of the central part 7 of the flight 1 overlaps these notches 20, the central part 7 having either square (FIG. 4) or I-shaped (FIG. 5) section, and the end parts 8 of the flights having their inner surfaces in the area of the joining with the central part, respectively, either plain or with matching projections 21 (FIG. 5).

The spacing "a" (FIG. 6) of the end face 22 of the central part 7 of the flight 1 from the end wall 23 of the opening 12, facing this part, is either substantially equal to or greater than the diameter of the portion 18 of the stud 2 (FIG. 5), received in the opening 12.

In a modification of the presently described embodiment of the invention, the head 11 of the stud 2 had made therein in the area of the through-going slot 13 a pair of partly-cylindrical peripheral recesses 24 (FIG. 7) adapted to accommodate the respective adjoining portions 25 of the horizontal links 26 of the respective chains 5 and 6.

There is also possible another modification of the drag member where the end portions of the flights 1 are so constructed that the components of the bolted joint 9 would not project beyond the periphery 27 of the end parts.

When the width of the opening 12 in the end part 8 of the flight 1 in the area of its joining with the central part 7 is greater than the diameter of the portion 18 of the stud 2 (FIG. 4), the drag member of a flight conveyer is assembled, as follows.

The studs 2 are fastened to the respective vertical links 4 of the respective chains 5 and 6 with the aid of resilient dowels or pins (or else, rivets) 14 inserted in the bores 15 of the heads 11 of the studs 2. The spacing or pitch of the studs 2 along the chains is set to correspond to the required spacing or pitch of the scraper flights 1.

The end part 8 of the flight 1 is moved into the stud 2 between its head 10 and 11, in a motion longitudinal of the would-be flight 1. Then the end portion of the central part 7 of the flight 1 is inserted into the opening 12 of the end part 8 of the flight 1, and the two parts 7 and 8 of the flight 1 are fastened together with the bolt 9.

When the width of the opening 12 of the end part 8 of the flight 1 in the area of its joining with the central part 7 is smaller than the diameter of the portion 18 of the stud 2 (FIG. 5), the sequence of securing the studs 2 on the respective chains 5 and 6 is the same (as described above), while the setting of the flights 1 is performed in the following sequence.

Figure 8:
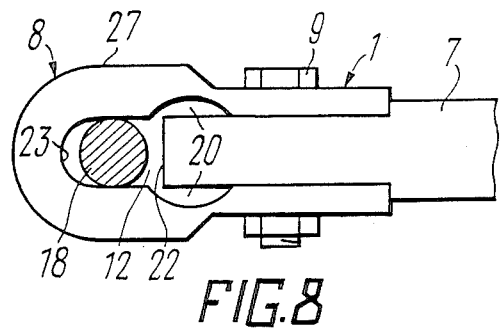
FIG. 8 shows a version of the joint between the flight and the chain, shown in FIG. 4.

The end part 8 of the scraper flight 1 is put onto the stud 2 over its head 10 by the portion of the opening 12 with the notches 20 (FIG. 8). Then the end part 8 of the flight 1 is shifted on the stud 2 to bring the latter closer to the end wall 23 of the opening 12 in the end part 8. The end portion of the central part 7 of the flight 1 is introduced into the opening 12 in the end part 8 of the flight 1, partly overlapping the vertical notches 20. In this relative position the end part 8 and the central part 7 of the flight 1 are fastened together by the bolted joint 9.

It is obvious that in both abovedescribed modifications of the drag member of a flight conveyer, it can be so assembled that the spacing "a" (FIG. 6) of the end face 22 of the central part 7 of the flight 1 from the end wall 23 of the opening 12 in the end part 8 of the flight 1 would be greater than the diameter of the portion 18 of the stud 2, received in the opening 12.

In a modification where the head 11 has the pair of partly-cylindrical recesses 24 in its periphery, the position of the stud 2 with respect to its carrier link 4 and adjacent links 26 is reliably fixed (FIG. 7).

The drag member is disassembled in a reverse order.

The drag member of a flight conveyer is operated, as follows. Under the pull of the drive (not shown) the drag member of the flight conveyer is set in motion. The successive scraper flights 1 on the carrying run of the flight conveyer are positioned substantially perpendicularly to the chains 5 and 6 and act upon the material being handled (coal), moving it along the conveyer.

Owing to the pivotal connection of the successive flights 1 to the chains 5 and 6, they are positioned substantially parallel with the latter in the return run of the conveyer, one chain 6 overlying the flights 1 and the other chain 5 underlying them.

In the working mode of the flight conveyer, where the two chains 5 and 6 become longitudinally displaced relative to each other in operation, the traction effort of the drive 2 is not unduly concentrated in the studs 2, as the latter can be freely displaced within the limits of the openings 12 in the respective end parts 8 of the flights 1.

As the end parts 8 and the respective central parts 7 of the flights 1 are detachably connected to one another, it is possible, whenever necessary, to replace selectively either one of these parts.

What is claimed is:

1. A drag member of a flight conveyer, comprising: flights of said conveyer; a pair of vertically spaced chains forming closed loops in respective horizontal planes; the chains having vertical links with straight portions, vertical studs connecting said flights to the straight portions of respective vertical links of said chains; each said flight comprising a detachable central part and two detachable end parts; each said end part of said flight being substantially U-shaped with two limbs and an opening there between, the opening accommodating a portion of said vertical stud and an end portion of said central part of the respective flight;

each said vertical stud having heads on the ends thereof, of a diameter greater than the width of said opening;

one of said heads having a through-going slot therein for joining said stud to the straight portions of the respective vertical link of said chain.

2. The drag member of a flight conveyer as claimed in claim 1, wherein the width of the opening in said end part of said flight in the area of the connection thereof with said central part of said flight is smaller than the diameter of the portion of said vertical stud, received in said opening, the surface of said opening defining vertical notches into which extends the respective end portion of said central part of said flight, the notches intended for the introduction into said opening of the other head of said stud when assembling the drag member.

3. The drag member of a flight conveyer as claimed in claim 1, wherein a spacing is provided between an end face of said central part of said flight and an end wall of said opening in said end part of said flight, said spacing being greater than the diameter of the portion of said stud, received in said opening.

4. The drag member of a flight conveyer as claimed in claim 1, wherein the one head of said stud includes a pair of peripheral partly-cylindrical recesses adapted to accommodate adjoining curving portions of respective horizontal links of the respective chain.

* * * * *